United States Patent [19]

Rhoades et al.

[11] Patent Number: 5,759,591
[45] Date of Patent: Jun. 2, 1998

[54] APPARATUS FOR THERMOFORMING A PLASTIC APPLIANCE DOOR

[75] Inventors: Randy R. Rhoades, Chandler, Ind.; Steven G. Tirrell, Galesburg, Ill.

[73] Assignee: Maytag Corporation, Newton, Iowa

[21] Appl. No.: 671,858

[22] Filed: Jun. 28, 1996

[51] Int. Cl.$^6$ ............................................. B29C 43/18
[52] U.S. Cl. .................... 425/387.1; 156/285; 156/382; 156/500; 425/150; 425/326.1; 425/388; 425/348 R
[58] Field of Search ...................... 425/387.1, 388, 425/348 R, 504, 508, 515, 150, 326.1, 345, 350; 156/382, 285, 499, 500

[56] References Cited

U.S. PATENT DOCUMENTS

| | | | |
|---|---|---|---|
| 2,012,262 | 8/1935 | Forsthoefel | 62/89 |
| 3,634,971 | 1/1972 | Kesling | 49/460 |
| 3,732,646 | 5/1973 | Horvay et al. | 49/487 |
| 3,779,687 | 12/1973 | Alesi | 425/383 |
| 3,882,637 | 5/1975 | Lindenschmidt | 49/501 |
| 4,106,884 | 8/1978 | Jegelka | 425/345 |
| 4,192,701 | 3/1980 | Martin et al. | 156/285 |
| 4,496,201 | 1/1985 | Allgeyer | 312/296 |
| 4,583,796 | 4/1986 | Nakajima et al. | 312/214 |
| 4,764,241 | 8/1988 | Makino | 156/382 |
| 4,883,419 | 11/1989 | Queirel | 425/326.1 |
| 5,108,529 | 4/1992 | Shuert | 156/214 |
| 5,168,621 | 12/1992 | Kruck et al. | 29/451 |
| 5,306,082 | 4/1994 | Karlin et al. | 312/405 |
| 5,427,732 | 6/1995 | Shuert | 264/545 |
| 5,460,497 | 10/1995 | Vismara | 425/4 R |
| 5,507,999 | 4/1996 | Copsey | 264/545 |

FOREIGN PATENT DOCUMENTS 1410215 10/1975 United Kingdom.

OTHER PUBLICATIONS

"Revolution in Refrigerators" Appliance Manufacturer Jun., 1994.

Primary Examiner—Jay H. Woo
Assistant Examiner—Iurie Schwartz
Attorney, Agent, or Firm—Allan P. Orsund

[57] ABSTRACT

Apparatus is provided for thermoforming a unitary plastic appliance door by thermoforming an outer door panel and an inner door liner and joining them together in a unitary apparatus. The apparatus includes a press with first and second platens, a male and a female mold member attached to the first platen and shaped to the contour of the outer door panel and the inner door liner respectively. A movable shuttle box is mounted on the second platen and a first plug assist member is located in the shuttle box. The shuttle box and first plug assist member are movable on the second platen into vertical alignment with either the male or female mold member. A transportation device is positioned between the first and second platens and is operable for transporting first and second plastic sheets into thermoforming posture with the male and female molds respectively. A second plug assist member is located for movement into and out of proximity with the female mold member. The shuttle box and first plug assist member are vertically alignable over the male mold member and cooperate to form the first door panel from the sheet as the platens move toward each other. The second plug assist member is cooperable with the female mold member for forming the second door panel from the second plastic sheet upon movement of the first platen toward the second plastic sheet.

10 Claims, 15 Drawing Sheets

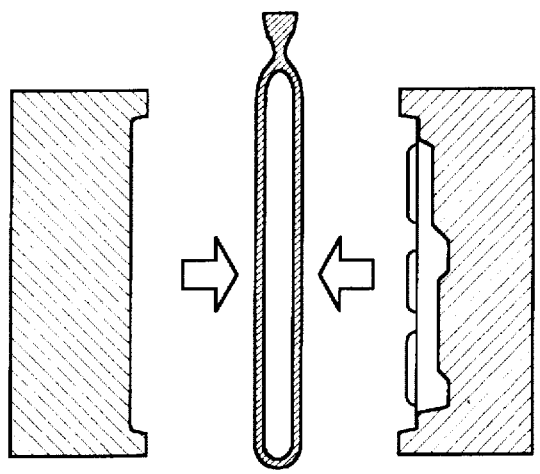
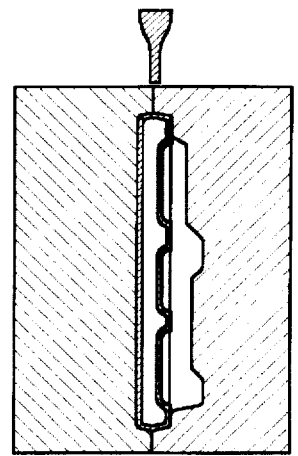
Fig.3A
*(PRIOR ART)*
Fig.3B
*(PRIOR ART)*
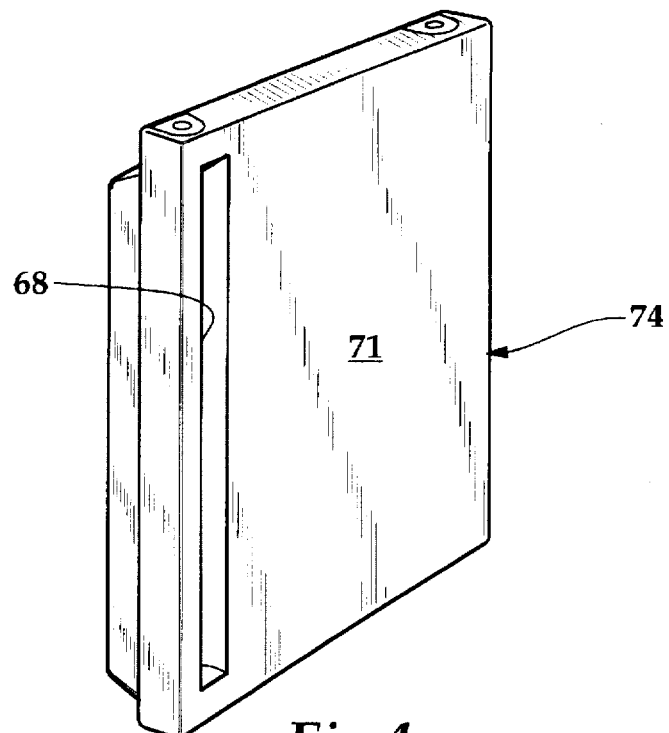
Fig.4
*(PRIOR ART)*

APPARATUS FOR THERMOFORMING A PLASTIC APPLIANCE DOOR

BACKGROUND OF THE INVENTION

1. Field of the Invention

The present invention pertains to the art of household appliances and, more specifically, to a method and apparatus for thermoforming a plastic appliance door from two plastic sheets.

2. Discussion of the Prior Art

It is commonly known to produce a plastic appliance door, and in particular, a refrigerator door by independently manufacturing the various components that combine to make the door and then, in a separate manufacturing step, assembling the various components. For example, as represented in FIG. 1 of this application, it is common to form an outer refrigerator door panel 5 from a single stamped sheet of metal which is folded in order to form sides 8 and inwardly turned flanges 10. The inner liner 13 associated with such a refrigerator door is often thermoformed on a male mold member. In general, such an inner liner 13 is made on the male mold member because of the high draw ratios that would be involved with the use of a female mold member. Once the outer refrigerator door panel 5 and the inner refrigerator door liner 13 are formed, inner liner 13 is secured to door panel 5 along flanges 10, along with an annular gasket 16, by means of a plurality of connecting strips 18 and screws 20. A separate handle 22 is then secured to outer refrigerator door panel 5 by means of screws 24. Outer refrigerator door panel 5 is also generally formed with upper and lower aligned holes 27 which are adapted to receive pivot bushings 29 for mounting the assembled refrigerator door to a refrigerator cabinet. For insulation purposes, it is also known to inject foam between refrigerator door panel 5 and inner liner 13 after complete assembly of the refrigerator door.

The manufacturing procedure associated with constructing such a refrigerator door formed from various, individually produced components which are later assembled together, is inefficient. Such a process is extremely time consuming and requires various manufacturing stages wherein the individual components are made and assembled. In addition, since the outer refrigerator door panel 5 is made of metal, its outer surface must be painted for aesthetic purposes. The need for these multiple manufacturing stages obviously increases the overall costs associated with manufacturing such a refrigerator door.

It has also been proposed to manufacture a hollow refrigerator door formed entirely from plastic. Such an arrangement is generally shown in FIGS. 2, 3a and 3b and disclosed in U.S. Pat. No. 5,306,082. According to this method of making a refrigerator door, the first step in the manufacturing process involves independently making the individual components which combine to form the inner door members. As shown in FIG. 2, these inner components generally constitute opposing side members 35, 37 and a plurality of shelf defining members 40–42. In general, these interior components are separately blow molded by arranging two parallel sheets of plastic between first and second mold members (see FIGS. 3a and 3b), closing the mold members so as to pinch the sheets about outer perimeters thereof and injecting air between the sheets so as to cause the sheets to expand against the mold members. Side members 35, 37 and shelf members 40–42 are formed with tabs 45 which are adapted to extend within slots 48 formed in an outer door panel 50 that is constituted by a hollow plastic slab which is also blow molded. In a final stage of the blow molding of the outer door panel 50, the tabs 45 provided on side members 35, 37 and shelf members 40–42 are positioned within slots 48 such that slots 48 form about tabs 45 in order to secure side members 35, 37 and shelf members 40–42 to outer door panel 50. An annular gasket 52 is then secured by means of connecting strips 55 and screws 57 to an outer annular flange portion 59 of door panel 50. In addition, a separate handle 62 is secured to door panel 50 by means of screws 64.

The refrigerator door construction arrangement as represented by FIGS. 2, 3a and 3b has several advantages over the construction arrangement represented in FIG. 1 and discussed above. First, the entire refrigerator door of the FIG. 2 arrangement is formed from plastic and therefore its desired shape can be readily varied. In addition, such a manufacturing operation does not require a subsequent painting stage for outer door panel 50. Furthermore, making the outer door panel 50 from plastic can provide some additional heat efficiency benefits since the metal door panel of the FIG. 1 arrangement will be a better conductor of heat into the refrigerator than the plastic door. Finally, the use of plastic presents the ability to integrally form the outer door panel with a handle as also proposed in the prior art and represented in FIG. 4.

However, these previously proposed all-plastic refrigerator door arrangements suffer from various drawbacks. For example, the various components which make up each of the refrigerator doors are still separately manufactured and subsequently assembled. As indicated above, this is considered inefficient as it adds to the manufacturing time and cost associated with making such doors. Furthermore, the known all-plastic refrigerator door arrangements are generally not aesthetically appealing since the interconnection between the various components are often noticeably visible and there will be a pinch line where the mold halves close. Finally, although forming an outer door panel of plastic with an integrally formed handle reduces manufacturing costs associated with the outer door panel and is rather aesthetically appealing, the prior proposed system as represented in FIG. 4 forms the handle, generally indicated in 68, by creating a recess in the front surface 71 of the outer door panel 74 which inherently reduces the energy efficiency of the refrigerator door as a whole due to its reduced thickness.

Therefore, there exists a need in the art for a plastic refrigerator door which can be produced in a minimum number of manufacturing stages so as to reduce the manufacturing costs associated with the refrigerator door. In addition, there exists a need in the art for a all-plastic refrigerator door and method of making the same wherein the energy efficiency associated with the refrigerator door is maintained or increased. Finally, there exists a need in the art for an aesthetically appealing plastic refrigerator door.

SUMMARY OF THE INVENTION

It is an object of the present invention to provide an improved method and apparatus for thermoforming an all-plastic appliance door which minimizes the manufacturing stages and associated costs of producing such a door.

It is another object of the invention to provide an improved thermoforming apparatus wherein the male and female mold members for forming the inner and outer door panels are both located on a first movable platen.

It is a further object of the present invention to provide an improved method of thermoforming wherein an exterior plug assist is located within a shuttle box mounted on a second movable platen.

It is a still further object of the invention to provide an improved method of thermoforming wherein the shuttle box and exterior plug assist are mounted for shuttle movement between the male and female molds.

These and other objects of the present invention are achieved by a method and apparatus for thermoforming an appliance door including providing a male mold member shaped to the contour of an inner door liner being formed and providing a female mold member shaped to the contour of an outer door panel being formed. Also provided is a movable shuttle box including a first plug assist, the shuttle box and first plug assist being moveable into registry with either of the male and female mold members. Further to this method, a first plastic sheet is moved into position with respect to the male mold member and subsequently the shuttle box and first plug assist are placed into contact with the first plastic sheet and into registry with the male mold member while applying heat and vacuum to the first plastic sheet to form the inner door liner. The shuttle box and first plug assist are then withdrawn from the male mold member with the door liner attached and the shuttle box and first plug assist are moved into a vertically aligned position with respect to the female mold member. A second plug assist, which cooperates with the female mold member, is moved into a vertical alignment position with respect to the female mold member and the female mold member is moved into contact with one side of the second plastic sheet. The second plug assist is actuated into contact with the opposite side of the second plastic sheet, into registry with the female mold member and heat and vacuum are applied to the second plastic sheet to form the outer appliance door panel. The second plug assist is retracted from the formed door panel which is retained within the female mold member and the shuttle box and first plug assist with attached door liner are moved into registry with the female mold member and attached door panel. Finally, the door liner and outer door panel are heat sealed together along respective peripheral edges thereof to form an appliance door.

Other objects, features and advantages of the invention should become apparent from the following detailed description of a preferred embodiment thereof, when taken in conjunction with the drawings wherein like reference numerals refer to corresponding parts in the several views.

BRIEF DESCRIPTION OF THE DRAWINGS

FIG. 3a is a cross-sectional view of a molding device used to make the refrigerator door of FIG. 2 in its open state.

FIG. 3b is a cross-sectional view of a molding device of FIG. 3a in its closed state.

FIG. 4 is a perspective view of another plastic refrigerator door constructed in accordance with the prior art.

DETAILED DESCRIPTION OF THE PREFERRED EMBODIMENTS

Figure 1:
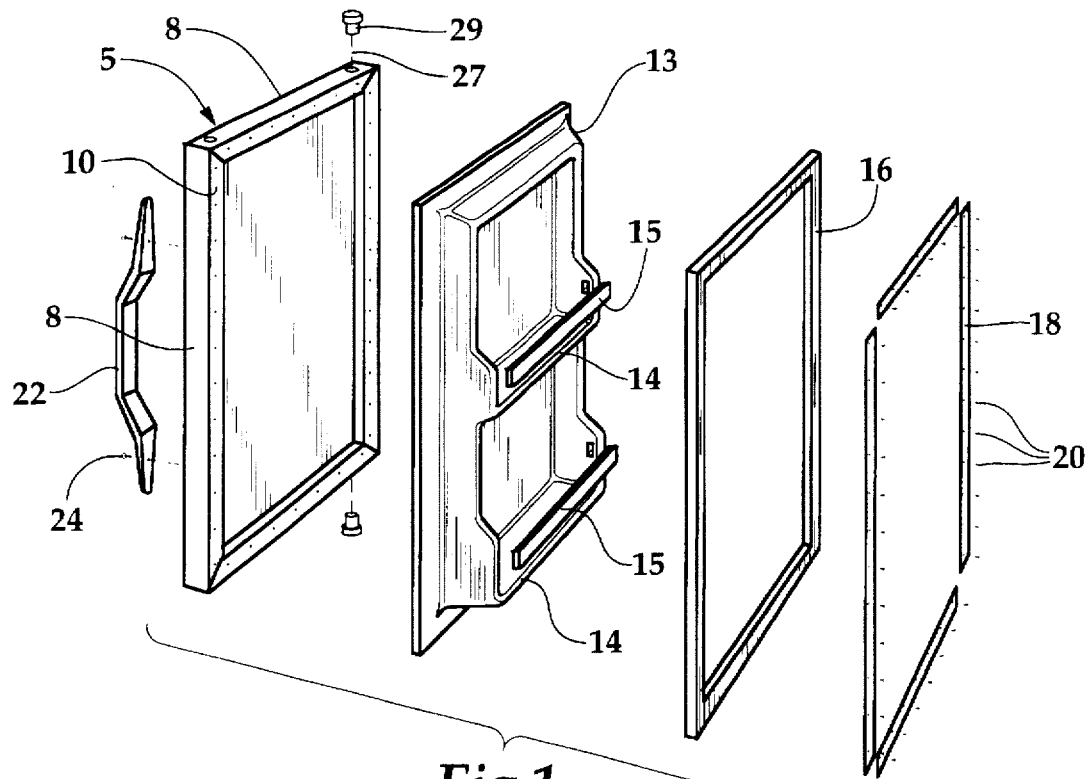
FIG. 1 is an exploded view of a refrigerator door constructed in accordance with the prior art.
Figure 2:
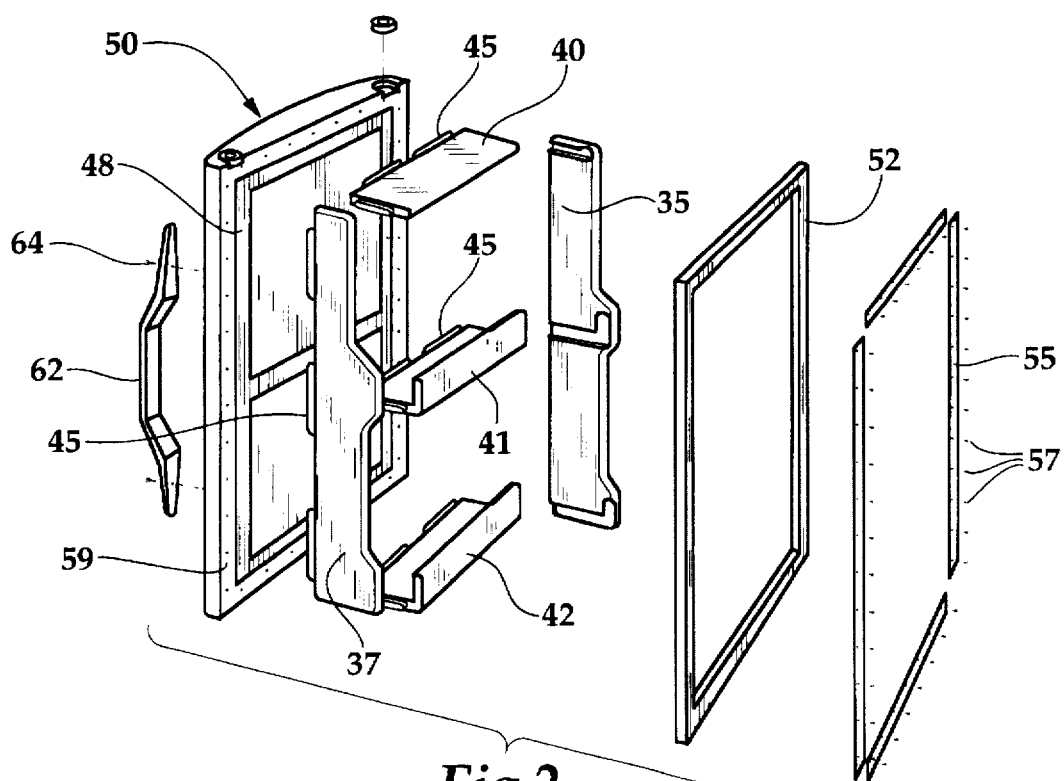
FIG. 2 is an exploded view of another refrigerator door constructed in accordance with the prior art.
Figure 5:
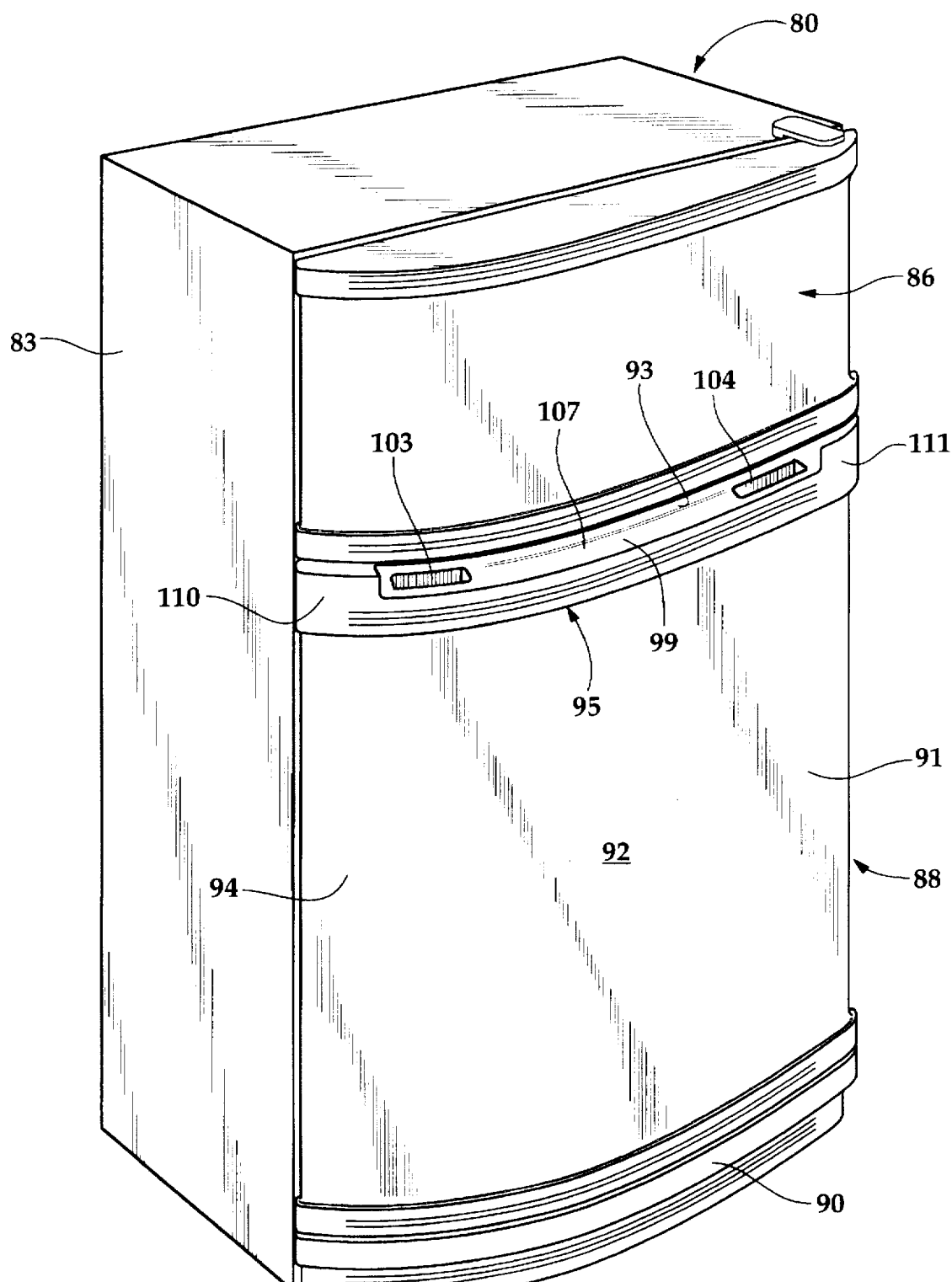
FIG. 5 is a perspective view of a refrigerator incorporating a unitary all-plastic refrigerator door constructed in accordance with the present invention.

FIG. 5 schematically depicts a refrigerator 80 constructed in accordance with the present invention. Refrigerator 80 generally includes a cabinet 83 having various compartments (not shown) formed therein that are selectively closed off by a freezer compartment door 86 and a refrigerator compartment door 88. Refrigerator 80 further includes a kick plate 90. It should be noted that the structure of cabinet 83 and kick plate 90 are not considered part of the present invention and therefore will not be further discussed herein. In addition, it should be noted that, although particular reference will be made to refrigerator compartment door 88 in describing the plastic refrigerator door and its method of manufacture in accordance with the present invention, it should be readily understood that the term "refrigerator door" refers to either a freezer compartment door or a refrigerator compartment door. The present invention is equally applicable to doors for combination refrigerator/ freezers or dedicated refrigerator or freezer units.

Refrigerator compartment door 88 includes an outer refrigerator door panel 91 and an inner refrigerator door liner (not shown in FIG. 5) as will be more fully discussed below. Outer refrigerator door panel 91 includes an outer wall portion 92 having an associated surface 93 and an inwardly turned annular sidewall 94. Outer wall portion 92 includes a thickened portion 95 that projects slightly outwardly from surface 93. A plateau section 99 includes left and right recess defining handles 103, 104 that are defined between a central plateau section 107 and left and right upstanding, thickened end portions 110, 111 of thickened portion 95. As is commonly known in the art, refrigerator door panel 91 can be pivotally mounted about a vertical axis to either the left or right hand sides of cabinet 83. For this reason, the left and right halves of refrigerator door panel 91 are preferably symmetrically formed with the left and right recess defining handles 103, 104. However, it should be readily understood that refrigerator door panel 91 could be designed for use in connection with a refrigerator 80 having a predetermined door opening side wherein only one handle may be required. In addition, although thickened portion 95 is depicted in the preferred embodiment of FIG. 5 to be located at the upmost portion of refrigerator door panel 91, it should be readily understood that thickened portion 95 could be repositioned in order to locate handles 103 and 104 at a desired location and orientation. Since thickened portion 95 projects outwardly from surface 93, the formation of handles 103 and 104 do not detract from the overall energy efficiency of refrigerator door panel 91. In other words, the heat transfer characteristics associated with refrigerator door panel 91 are only increased by the presence of thickened portion 95 as opposed to the inherent decrease in the desired heat transfer characteristics that could be present if a handle was defined by a recess formed inward of surface 93.

In accordance with the preferred embodiment, refrigerator compartment door 88 is made by a thermoforming process which advantageously enables the particular shape of refrigerator door panel 91 to be readily altered if desired. In addition, in accordance with the present method of thermoforming a refrigerator door, refrigerator compartment door 88 can be advantageously made from two plastic sheets utilizing a single molding apparatus with the inner door liner 130 associated with refrigerator compartment door 88 being formed on a male mold member as now will be discussed with reference to FIGS. 6–17.

Figure 6:
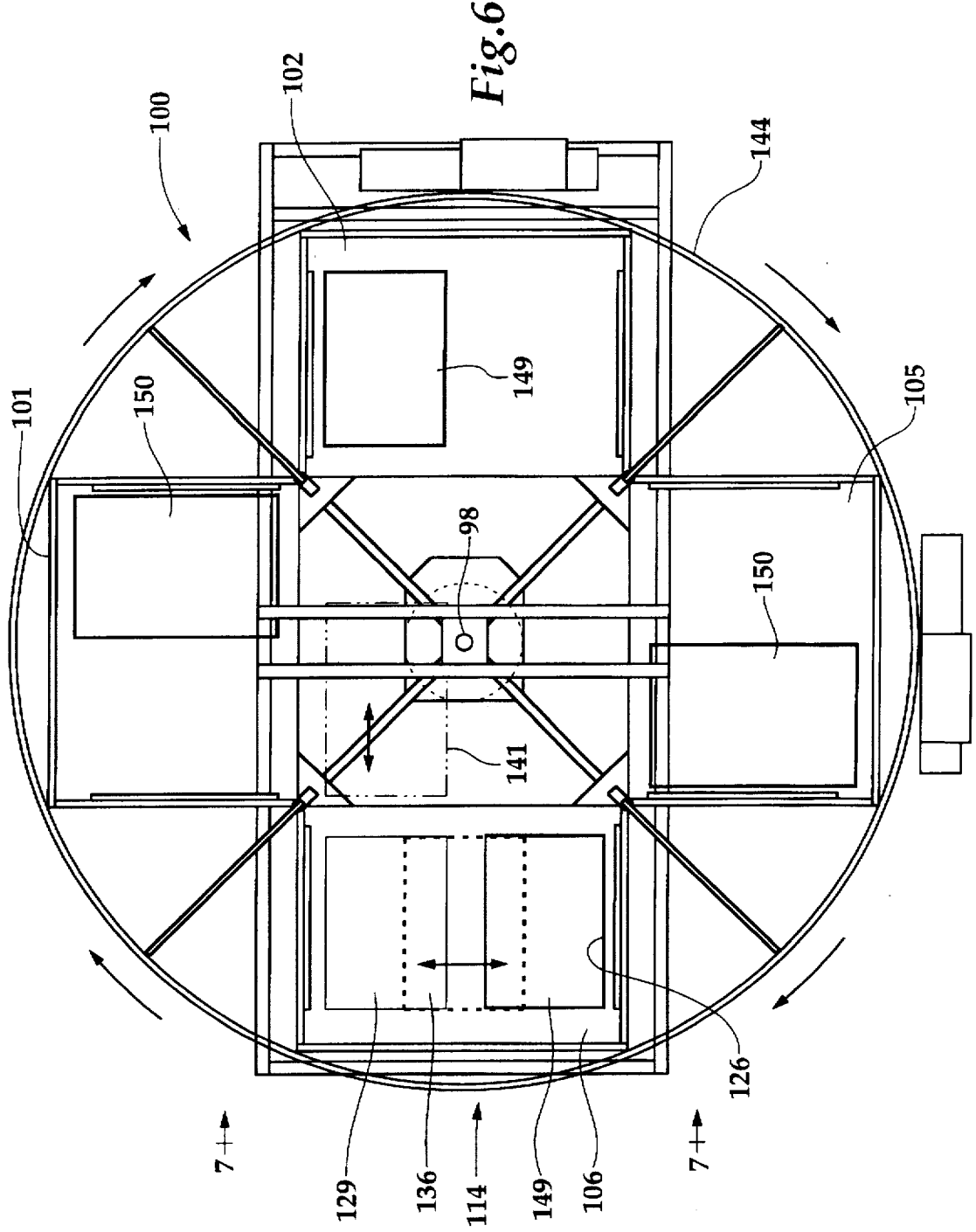
FIG. 6 is a schematic plan view of the thermoforming process layout for thermoforming a unitary plastic refrigerator door.

FIG. 6 shows in schematic form a plan view of the machine set-up for thermoforming the refrigerator door 88 of FIG. 5. A carousel transportation member 100 is rotatable about an axis 98 between a loading-unloading station 101, a preheat oven 102, a final heat oven 105 and a forming station 106 housing the forming machine or press 114. The transportation member 100 is circular in shape and is divided into quadrants which alternately mount and transport or shuttle first and second plastic sheets 149 and 150 for rotational movement through the forming station 106. The machine set-up for thermoforming could be linear rather than the preferred carousel arrangement shown herein. Such an arrangement is described in U.S. Pat. No. 5,533,511 issued Jul. 9, 1996 and assigned to the assignee of the present application. This linear arrangement is hereby incorporated by reference.

As best shown in FIGS. 7–17, the forming station 106 includes a machine or press 114 that includes upper and lower movable platens 115 and 116 which in operation move toward and away from each other. The upper and lower platens 115 and 116 are each equipped with stationary stops 119 and 120 that contact each other at predetermined stages when the tool 114 is operated and assure alignment of the platens 115 and 116. The upper platen 115 has at least four lock arms 121 which mate with at least four corresponding lower platen lock arms 122 in order to lock the upper and lower platens 115 and 116 together. In the preferred embodiment, the upper and lower lock arms 121 and 122 are engaged with a bayonet locking arrangement.

Figure 7:
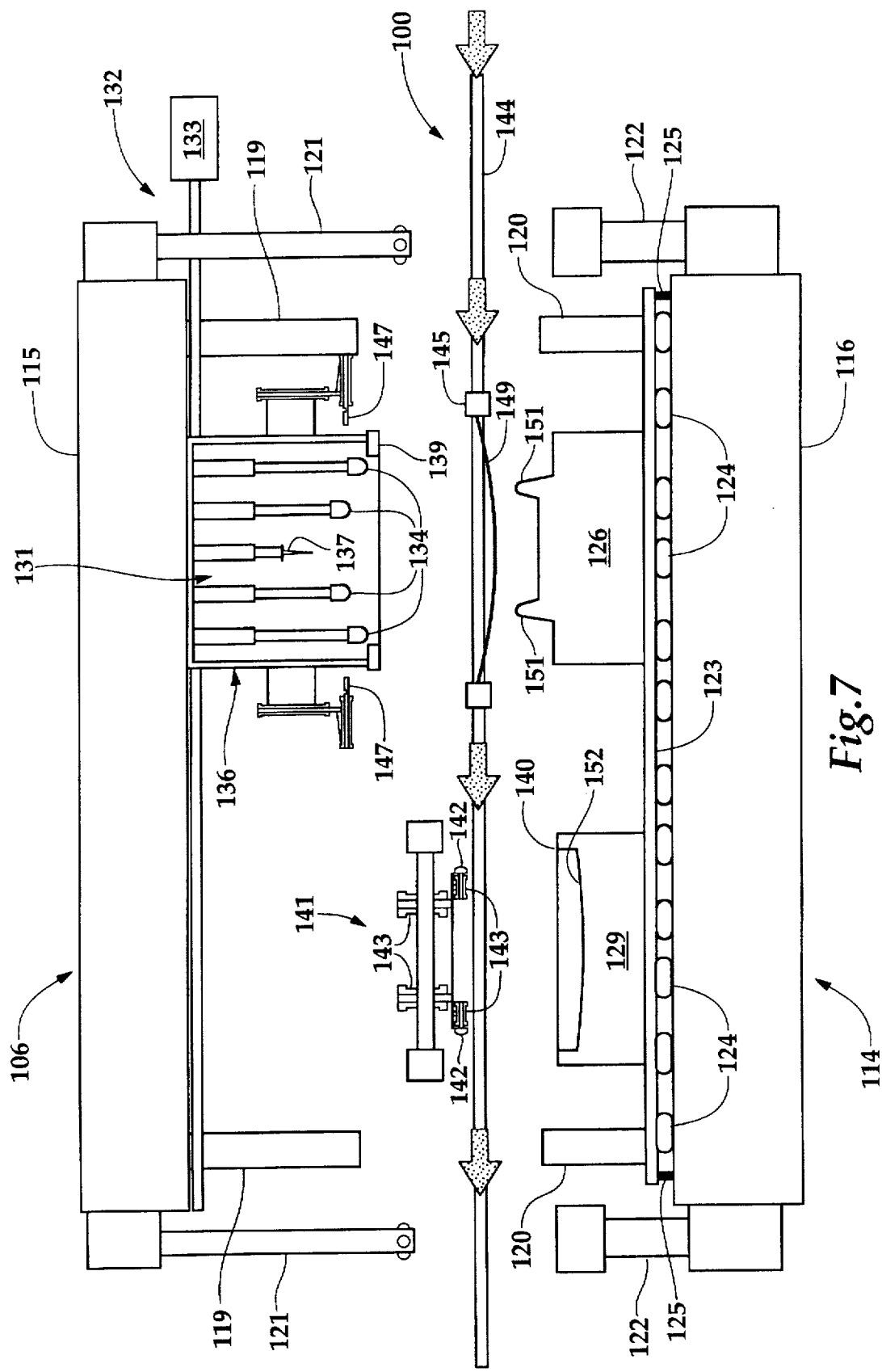
FIG. 7 illustrates the initial stage in the method of forming the inner liner of the refrigerator door shown in FIG. 5.

As further shown in FIG. 7, the lower platen has a mold mounting plate 123 mounted on a plurality of pressureizable forming air bags 124 and located by guide pins 125 at each corner of the mounting plate 123. In the preferred embodiment, laterally spaced apart male and female molds 126 and 129 are attached to the mounting plate 123 in a substantially side-by-side arrangement. The male mold 126 is used for forming the inner door liner 130 of the refrigerator or appliance door 88 and the female mold 129 is used for forming the outer door panel 91 of a refrigerator or appliance door 88.

The upper platen 115 includes a movable first plug assist member 131 which faces the male and female molds 126 and 129 that are attached to the lower platen 116. The first plug assist member 131 can be moved laterally between the male and female molds 126 and 129 for vertical alignment therewith by means of a drive system 132 driven, in this embodiment, by an electric motor 133. The first plug assist member 131 has a plurality of surfaces 134 that cooperate with the opposed surfaces of the male mold 126 to assist in the forming of the inner door liner 130 by pushing the plastic sheet material into conformity with the surface of male mold member 126.

The first plug assist member 131 is enclosed in a box-like structure or shuttle box 136 that forms a substantially air tight pressureizable enclosure when engaged with a sheet of plastic and in registry with either the male or female molds 126 and 129. The box-like structure or shuttle box 136 further includes a mold trimming pinch surface or back-up plate 139 extending around the full perimeter of the shuttle box 136. The female mold 129 has an in-mold steel trimming rule 140 which likewise extends around its outer perimeter and is cooperable with the pinch surface 139 of the shuttle box 136 for trimming the joint edge of the two panels that form the refrigerator or appliance door 88 as will be further discussed with respect to FIG. 17.

Located adjacent the position of the female mold 129 and horizontally movable into and out of proximity therewith, is a second plug assist member 141. The second plug assist member 141 has a plurality of movable surfaces 142 operated by pneumatic rams 143 that aid in forming the shape of the outer door panel 91. It is anticipated that hydraulic rams could be substituted for the pnuematic rams 143.

Figure 11:
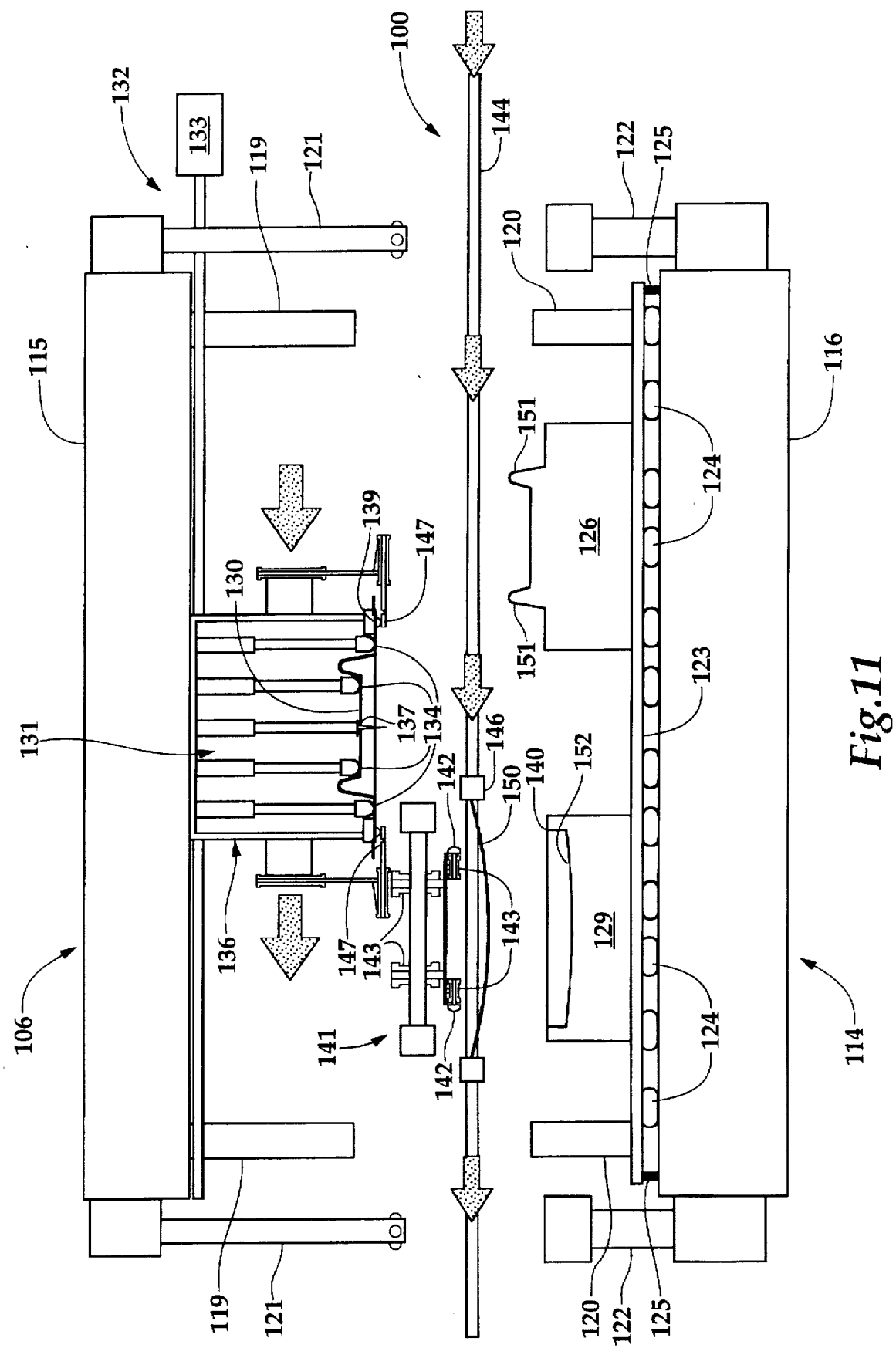
FIG. 11 is a view of the initial stage in the process of forming the outer door panel of the refrigerator door shown in FIG. 5.

As still further shown in FIGS. 7 and 11 the transportation member 100 includes a rail arrangement 144 between the upper and lower platens 115 and 116 for carrying sheet support members 145 and 146 that shuttle or transport plastic sheets 149 and 150 into position above the male and female molds 126 and 129 respectively.

Figure 8:
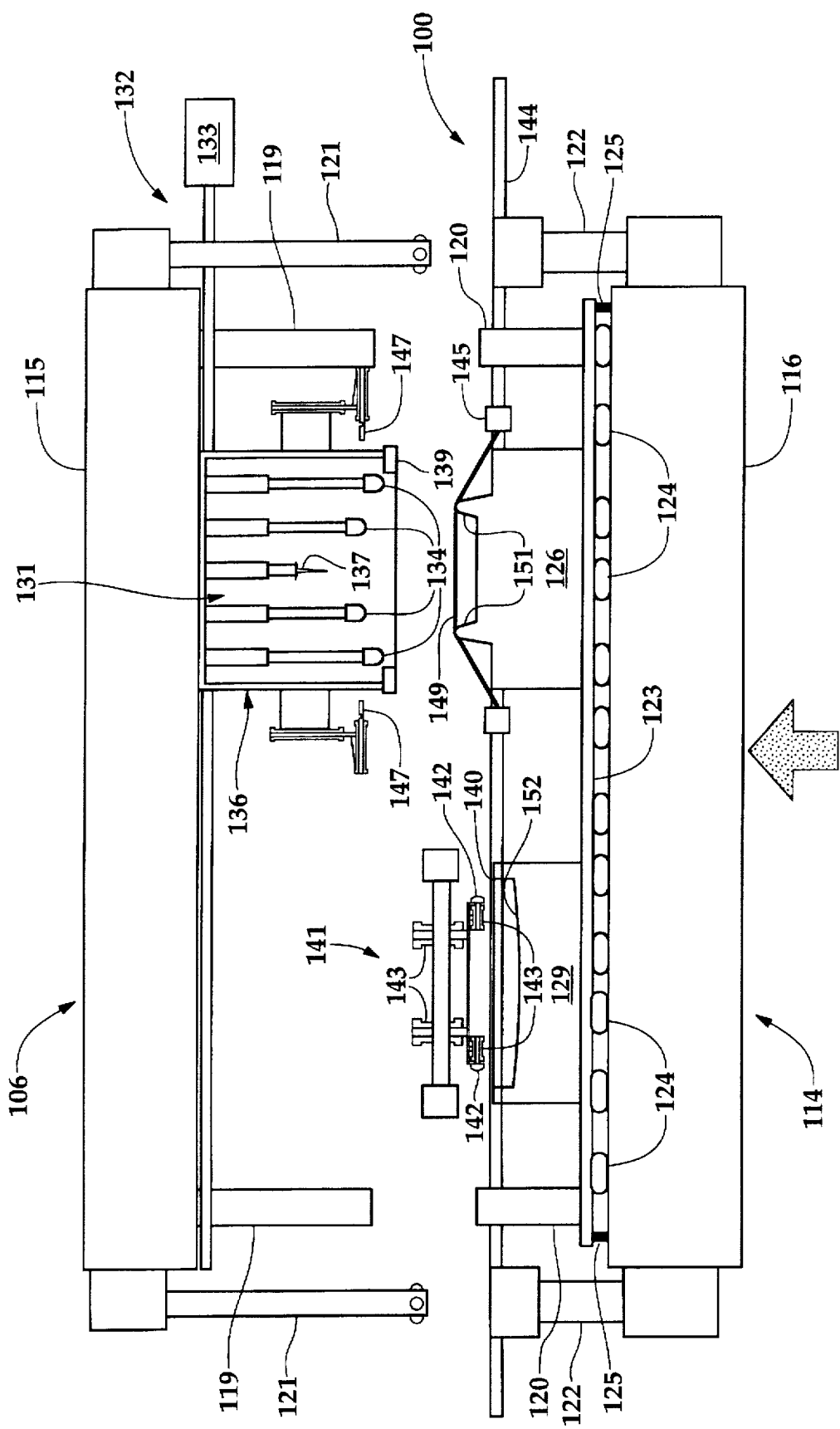
FIG. 8 is a view of the molding apparatus of FIG. 7 in another stage of forming the inner liner.
Figure 9:
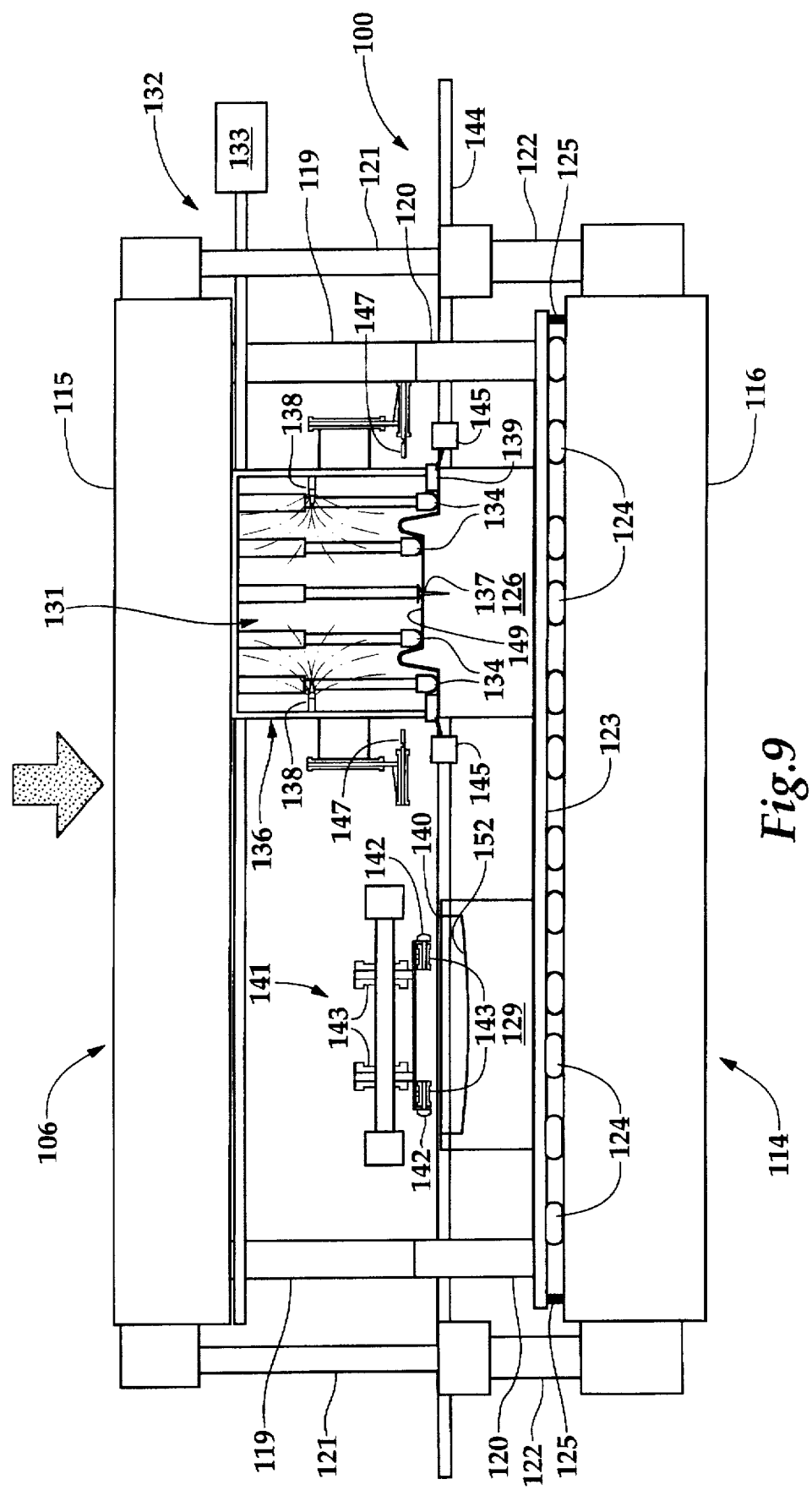
FIG. 9 is a view of the molding apparatus of FIG. 8 in a subsequent manufacturing stage of forming the inner liner.

Referring again to FIG. 7, the method of forming a two-panel plastic refrigerator or appliance door 88 will be described. First, the shuttle box 136 and first plug assist member 131 are aligned vertically above the male mold 126. With the upper and lower platens 115 and 116 separated, a first plastic sheet 149 mounted on a first sheet support member 145 is shuttled or moved from a final heat oven 105 into position over the male mold 126 by way of the rail arrangement 144. Next, as shown in FIG. 8, the lower platen 116 is moved upwardly so that dike forming portions 151 of the male mold 126 will engage and place tension on the first plastic sheet 149. At this point, the upper platen 115 is moved downwardly toward the lower platen 116 placing the shuttle box 136 housing the first plug assist member 131 into contact with the first plastic sheet 149 and into registry with the male mold 126. The various surfaces 134 of the first plug assist member 131 engage the upper surface of the first sheet of plastic 149 and push the plastic sheet 149 into the corners of the male mold 126 to conform the plastic sheet 149 to the surface of the male mold 126 as best shown in FIG. 9. At approximately the same time, a vacuum is applied to the lower surface of the first plastic sheet 149 through the male mold 126. As previously discussed, the shuttle box 136 can be pressurized and thus pressure may be applied to the inner surface of the plastic sheet 149 by pressurizing the shuttle box 136. Thus, the first plastic sheet 149 has been formed into an inner door liner 130. The formed inner door liner 130 is then clamped to the pressurized shuttle box 136.

Figure 10:
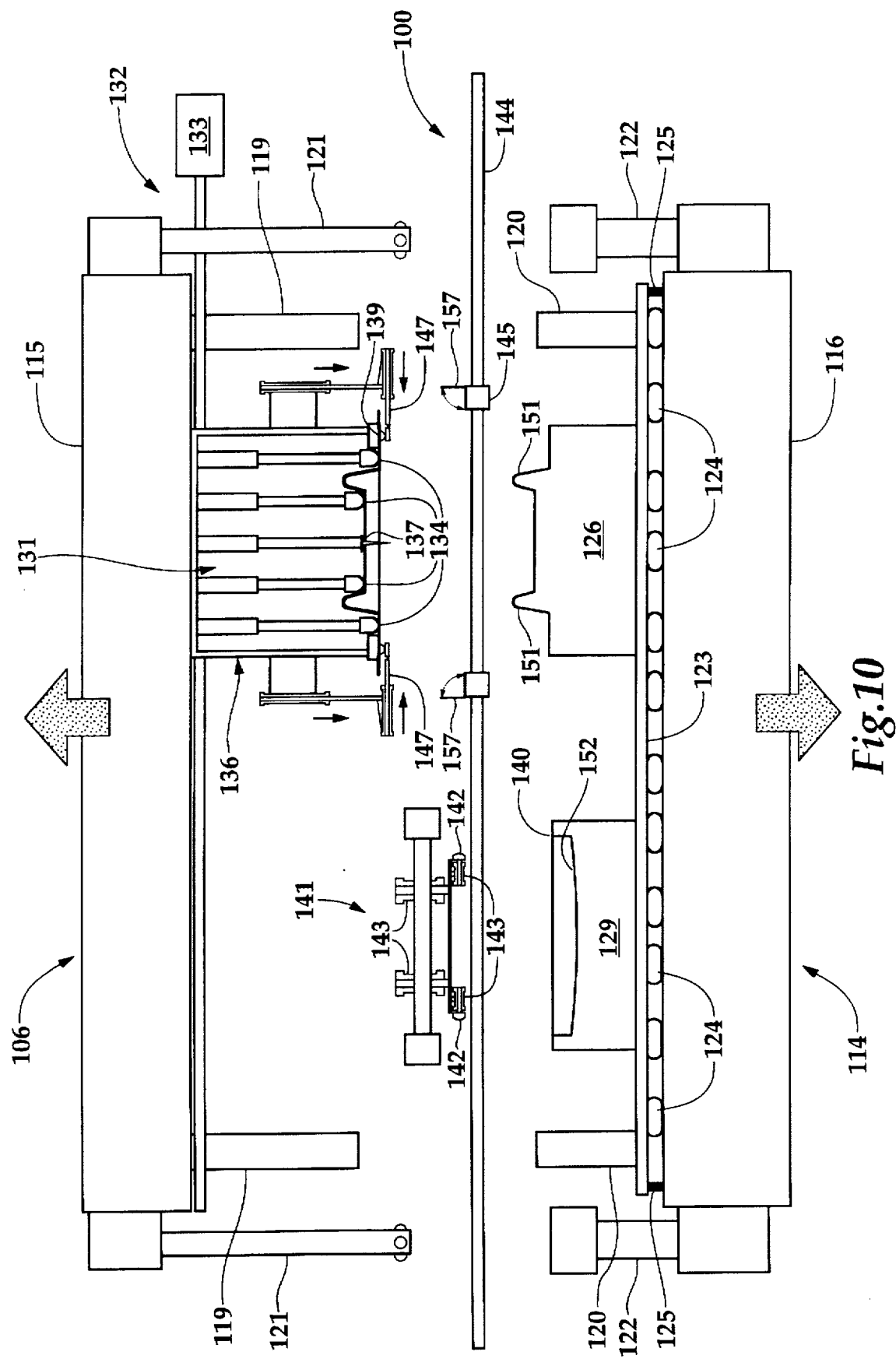
FIG. 10 is a view of the molding apparatus of FIG. 8 upon completion of forming the inner liner.

Once the inner door liner 130 has been formed in this manner, the lower platen 116 is retracted. The first sheet support member 145 is then released from the formed inner door liner 130 by unclamping the clamp frames 157 as shown in FIG. 10 and the inner door liner 130 will remain clamped to the shuttle box 136. The upper and lower platens 115 and 116 are separated from each other as shown in FIG. 10 with the inner door liner 130 held by picker devices (not shown) that engage with undercut areas of the inner door liner 130 and raise the inner door liner 130 with the upper platen 115.

There is shown schematically on the sides of the shuttle box 136 in FIG. 10, heaters 147 which may be attached to the shuttle box 136 and placed adjacent the peripheral edge 158 of the formed inner door liner 130 for applying heat to the inner door liner 130 for maintaining a predetermined material temperature around the peripheral edge 158. This heater 147 may be of any well known type such as calrod, ceramic or quartz.

Next, the shuttle box 136 and attached inner door liner 130 are driven or shuttled horizontally to a position vertically aligned over the top of the female mold 129. Simultaneously, as shown in FIG. 11, a second plastic sheet 150 is shuttled or transported into position over the female mold 129 by a second sheet support member 146. Also at this time, the second plug assist member 141 is moved into position over the top of the second plastic sheet 150 and into registration with the cavity 152 of the female mold 129, as shown in FIG. 12.

Figure 12:
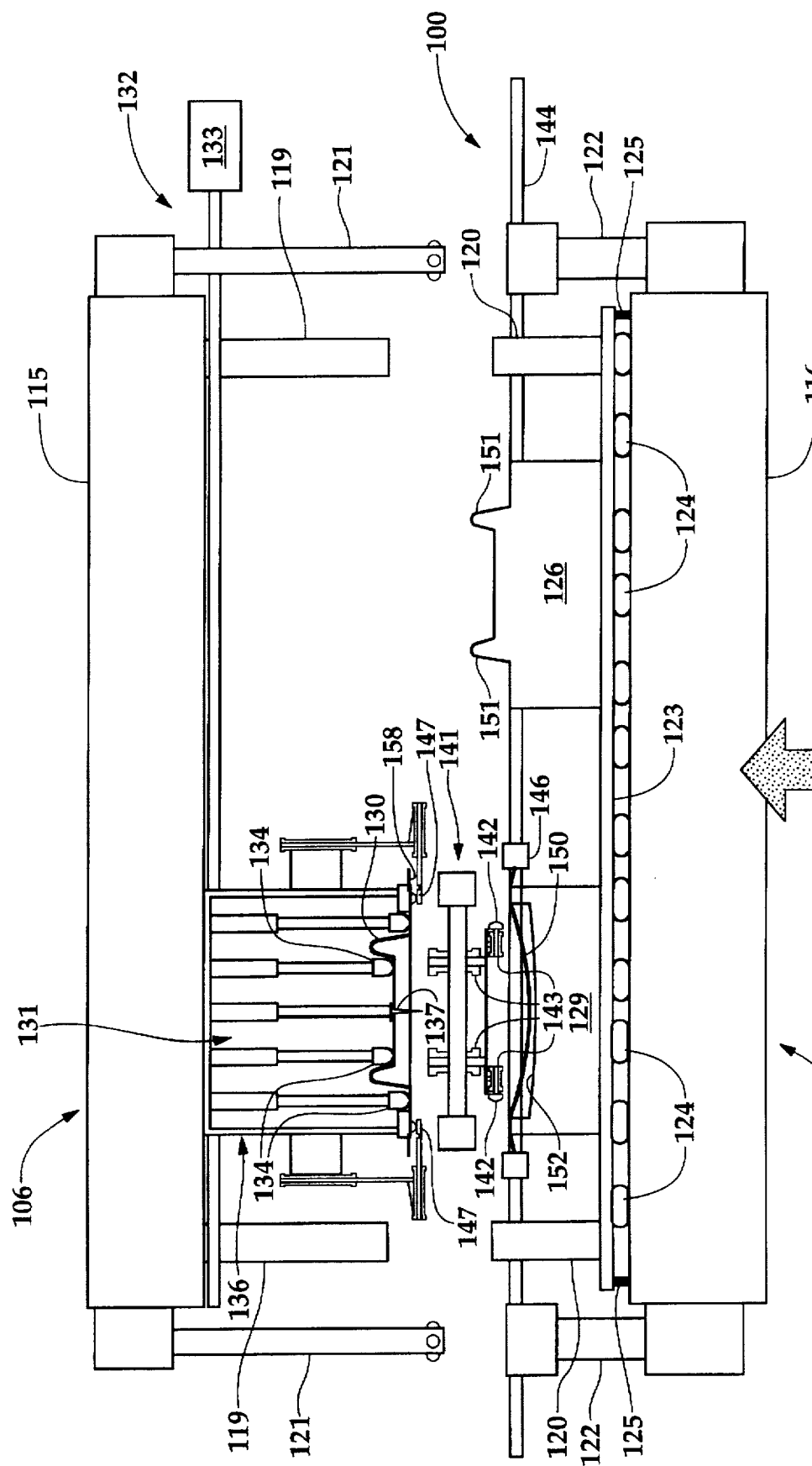
FIG. 12 is a view of the molding apparatus utilized in accordance with the present invention in a subsequent outer door panel forming stage.
Figure 13:
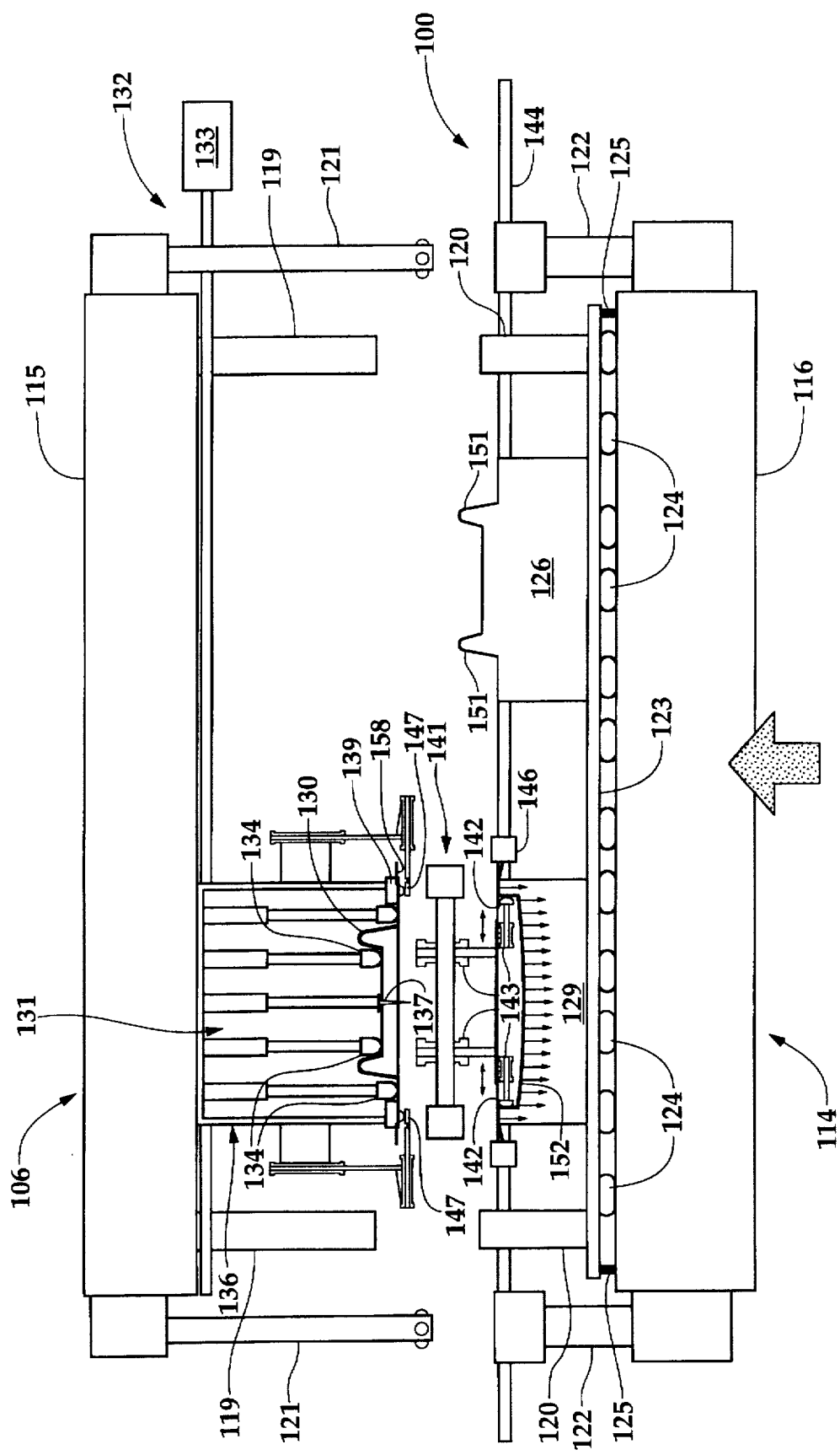
FIG. 13 is a view of the molding apparatus in another stage of forming the outer door panel.
Figure 14:
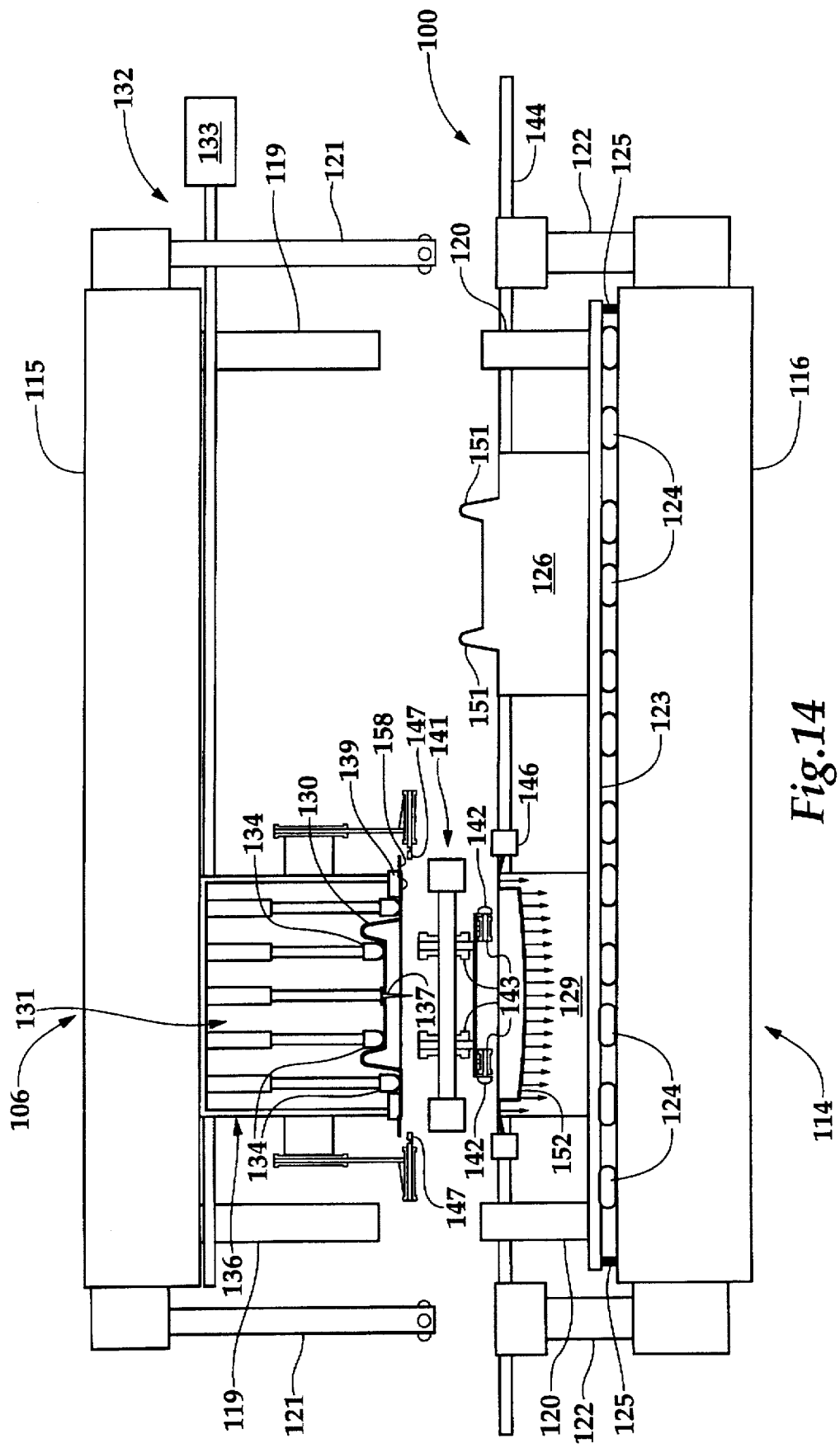
FIG. 14 is a view showing the posture of the apparatus just prior to joining the inner liner and outer door panel.

As is apparent in FIG. 12, the lower platen 116 of the press 114 is now moved upwardly to move the female mold 129 into contact with the bottom of the second plastic sheet 150 to place slight tension on the plastic sheet 150. Next, heat is applied to second plastic sheet 150 and as shown in FIG. 13, a vacuum is applied to the lower surface of the second plastic sheet 150 through the female mold member 129 to conform the second plastic sheet 150 to the cavity 152 of the female mold 129 while at the same time, the second plug assist member 141 is actuated to deploy the movable surfaces 142 for assisting in forming at least the side wall portions of the outer door panel 91. Thus, the second plastic sheet 150 has been formed into an outer door panel 91. Once the outer door panel 91 has been formed onto the female mold member 129, the second plug assist member 141 is quickly retracted as shown in FIG. 14 and is backed away as shown in FIG. 7 and into the plane of FIG. 14.

Figure 15:
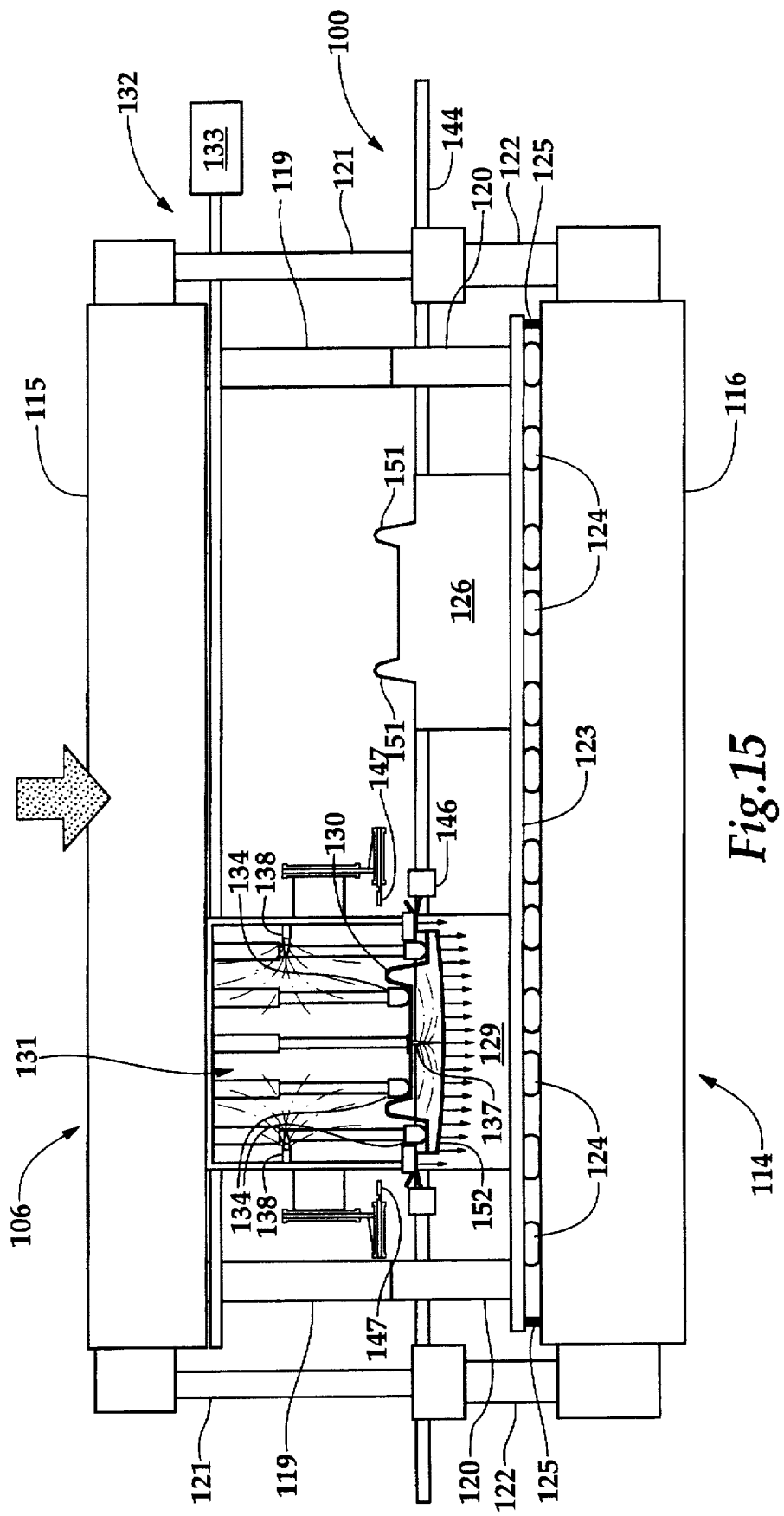
FIG. 15 is a view depicting the step of joining the inner liner and outer door panel

With the second plug assist member 141 out of the way and the heaters 147 retracted, the shuttle box 136 including the first plug assist member 131 with the attached inner door liner 130 is lowered into a registry position on top of the formed outer door panel 91 that has been retained within the female mold 129 by lowering the upper platen 115 of the press 114 as shown in FIG. 15. Once this is done and registry is accomplished so that the inner door liner 130 is engaged with the outer door panel 91, the upper and lower lock arms 121 and 122 are engaged and locked and the air bags 124 are inflated to move the mold mounting plate 123 slightly upward on guide pins 125 to squeeze the inner door liner 130 and outer door panel 91 together around their periphery. At this time, pressure may be applied to the shuttle box 136 by injecting air through air ports 138 while injecting air through blow pin 137 into the space between the inner door liner 130 and the outer door panel 91 to pressure form the exterior. Differently stated, with the application of heat, the inturned edge 153 of inner door liner 130 is joined or fused to the inwardly turned annular sidewall portion 94 of outer door panel 91, see FIGS. 15 and 17. Once these two portions of refrigerator door 88 are joined, air pressure can be immediately applied through the blow pin 137 into the interior of the newly formed refrigerator compartment door 88 and into the shuttle box 136 through air ports 138 to enhance the details of outer door panel 91 with the air pressure within the shuttle box 136 and within the refrigerator door 88 being equal. The steel rule 140 in the mold 129 will trim the outer perimeter edge of the door 88. As best shown in the cross section of FIG. 17, the steel rule 140 has a knife edge 148 which engages with the back-up plate or pinch surface 139 for trimming the refrigerator door 88.

Figure 16:
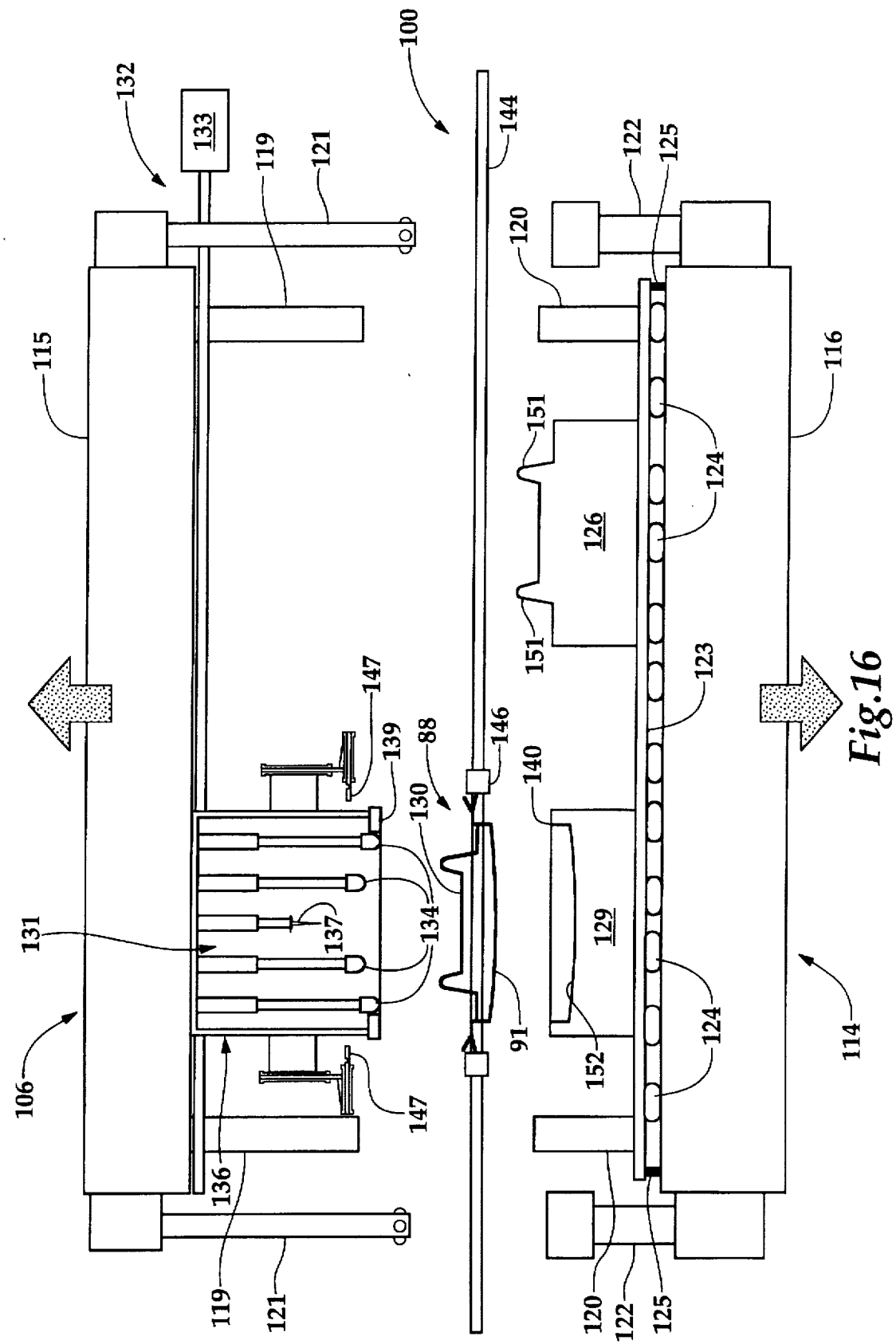
FIG. 16 is a view of the forming apparatus in an open state following completion of the forming operation.

After this joining and rough trimming operation is complete, the upper and lower platens 115 and 116 are separated as shown in FIG. 16 and the shuttle box clamps (not shown) are released leaving the door 88 on the second sheet support member 146. The knife edge 148 is interrupted at several preselected locations around the peripheral edge 158 so that during trimming a plurality of tabs (not shown) will remain to permit the completed refrigerator door 88 to move with the second support member 146 by way of the trimmed excess material. The completed refrigerator door 88 is shuttled or transported out from between the upper and lower platens 115 and 116 and toward unloading station 101 where an operator can quickly cut away the tabs and remove the peripheral excess plastic. The shuttle box 136 is now shuttled or transported back into the initial position over the male mold member 126 and the process is repeated.

Figure 17:
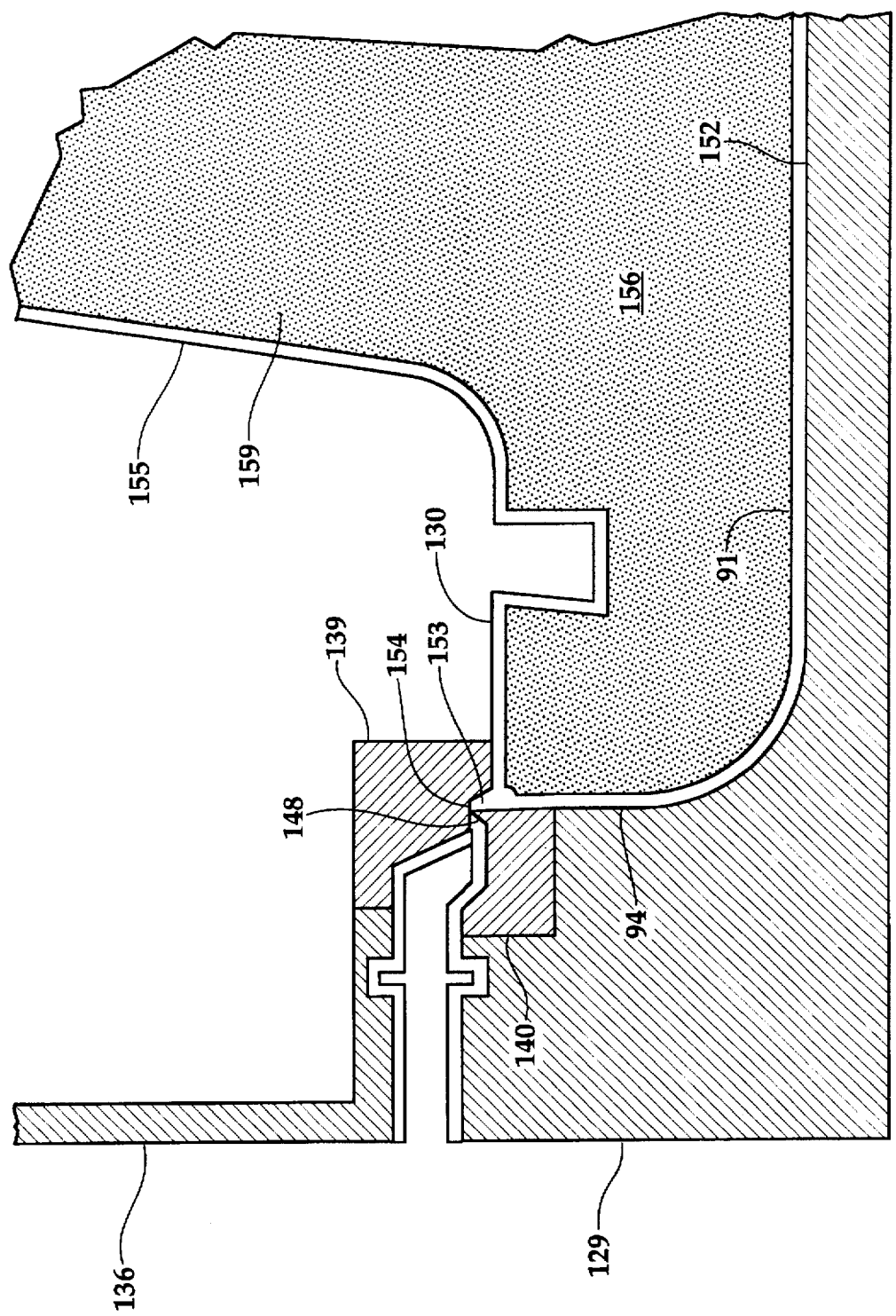
FIG. 17 is an enlarged sectional view of a portion of the formed refrigerator door of the present invention showing in detail the trimming rule in the female mold member and the back-up plate in the shuttle box.

The interconnection between inturned edge 153 of inner refrigerator door liner 130 and inwardly turned annular sidewall 94 of outer refrigerator door panel 91 is perhaps best shown in the enlarged view of FIG. 17. Once the thermoformed refrigerator door 88 is removed from the forming area, this joined area between inner refrigerator door liner 130 and outer refrigerator door panel 91 may be rounded or beveled if desired. When refrigerator door 88 is assembled to the cabinet 83, the trim line 154 is hidden from frontal and side view and a seam defined by the joined area is located between annular side wall portion 94 and dike portion 155 and extends substantially perpendicular to an outer wall portion of door panel 91 as clearly shown in FIG. 17.

FIG. 17 also illustrates that, in accordance with the preferred embodiment of the invention, the internal chamber 156 defined between outer refrigerator door panel 91 and inner refrigerator door liner 130 can be filled with a heat insulating material. In the preferred embodiment, foam 159 is injected into internal chamber 156 and extends even into dike portion 155 in order to provide, in addition to enhanced thermal specifications for refrigerator compartment door 88, additional structural rigidity without significantly increasing the weight of refrigerator compartment door 88.

From the above discussion, it should be readily apparent that forming an allplastic refrigerator door in accordance with the present invention minimizes the number of manufacturing steps necessary and results in reduced manufacturing costs. In addition, since the refrigerator door is completely made from plastic, it will be a more durable than conventional metal/plastic doors and can be more versatile in design. One of the key benefits to the manufacturing process is that the door can be manufactured such that the joining seam whereat the outer door panel meets the inner liner faces toward the inside of the refrigerator. Due to this positioning of the seam, a door gasket can be advantageously designed to cover the seam so as to provide an extremely aesthetically appealing overall assembly.

A gasket arrangement for use with the refrigerator compartment door 88 as shown herein is described, for example, in drawing FIGS. 14 and 15 and specification at column 8 of U.S. Pat. No. 5,533,311 issued Jul. 9, 1996 and assigned to the assignee of the present application. This gasket arrangement is hereby incorporated by reference.

Although various materials could be utilized in connection with the present invention to form the refrigerator door, in the preferred embodiment, outer refrigerator door panel 91 is formed from a sheet of a high impact polystyrene layer of approximately 92–97 mils in thickness having an acrylic cap layer of polymethylmethacrylate in the order of 3–8 mils. The refrigerator door liner 130 is preferably formed of high impact polystyrene. In addition, a foam barrier layer of a styrenic alloy may be used on the inside surfaces of both the outer refrigerator door panel 91 and the inner refrigerator door liner 130 when certain corrosive foams are injected within internal chamber 156. It is also possible to use polyvinylchloride as the material for either of these components. If polyvinylchloride is utilized, no cap layer or foam barrier will be necessary. However, the use of the polystyrene over the polyvinylchloride is preferred based on cost factors. Instead of the polymethylmethacrylate used for the cap layer, it is also possible to utilize styrenemethylmethacrylate.

As indicated above, the refrigerator door constructed in accordance with the invention will be more energy efficient than conventional doors utilizing metal panels which inherently conduct more heat into the unit. This efficiency characteristic is further enhanced by locating the thickened portion of the door that contains the handles closer to the periphery of the door than to the dike. Obviously, the plastic also provides a corrosion resistant door that does not require painting.

It is envisioned that the sequence of various steps described for forming the refrigerator door 88 can be modified. For example, the step of moving the shuttle box 136 from being vertically aligned with the male mold member 126 and attached door liner 130 to a position vertically aligned with the female mold member 129 may be done after the second plug assist member 141 and the female mold member 129 have formed the outer door panel 91. Also, as discussed herein, the shuttle box 136 does not have to be pressurized and it is not always necessary to inject air into the internal chamber 156 when joining the inner door 130 to the outer door panel 91. Other possible changes in the sequence of steps will be apparent to persons skilled in the art.

Although described with respect to a preferred embodiment of the invention, it should be readily understood that various changes and/or modification can be made to the present invention without departing from the spirit thereof. In general, the invention is only intended to be limited by the scope of the following claims.

What is claimed is:

1. Apparatus for thermoforming an appliance door, comprising:
    a press having first and second platens selectively movable with respect to each other;
    a male mold member attached to the first platen and shaped to the contour of a first door panel;
    a female mold member attached to the first platen spaced from the male mold member and shaped to the contour of a second door panel;
    a movable shuttle box mounted on the second platen;
    a first plug assist member within the shuttle box, the shuttle box and first plug assist member being movable on and generally parallel to the second platen into vertical alignment with either the male or female mold member;
    a transportation member positioned between the first and second platens and operable for transporting a first plastic sheet into a thermoforming posture with respect to the male mold member and for transporting a second plastic sheet into a thermoforming posture with respect to the female mold member;
    a second plug assist member positioned for selective movement into and out of proximity with the female mold member;
    the shuttle box and first plug assist member being vertically alignable over the male mold member and cooperable therewith for forming the first door panel from the first plastic sheet upon movement of the first and second platens toward each other; and
    the second plug assist member being cooperable with the female mold member when in proximity thereto for forming the second door panel from the second plastic sheet upon movement of the first platen to bring the female mold member into engagement therewith.

2. The apparatus for thermoforming an appliance door of claim 1 wherein the shuttle box is movable into registry with the female mold member to engage the first and second door panels while heat is applied to join the first and second door panels.

3. The apparatus for thermoforming an appliance door of claim 2 wherein the first platen further includes an inflatable actuating structure operable for moving the female mold toward the shuttle box to apply pressure to the first and second door panels.

4. The apparatus for thermoforming an appliance door of claim 2 wherein the transportation member is further operable for transporting the joined first and second door panels from the apparatus.

5. The apparatus for thermoforming an appliance door of claim 1 wherein the first plug assist member includes surfaces cooperable with the shape of the male mold to conform the first plastic sheet thereto.

6. The apparatus for thermoforming an appliance door of claim 1 wherein the second plug assist member includes surfaces cooperable with the female mold to conform the second plastic sheet thereto.

7. The apparatus for thermoforming an appliance door of claim 1 wherein the shuttle box further includes pressurizing structure having a plurality of air ports for applying air pressure and the shuttle box is registered with the male mold member and pressurized by applying air pressure as heat and vacuum are applied to the first plastic sheet to form the first door panel.

8. The apparatus for thermoforming an appliance door of claim 1 wherein the second plug assist is located outside the confines of the first and second platens and is transported into proximity with the female mold when the second door panel is formed.

9. The apparatus for thermoforming an appliance door of claim 2 wherein the shuttle box includes a plurality of air ports for applying air pressure to pressurize the shuttle box and the interior of the appliance door to further define the second door panel.

10. Apparatus for thermoforming an appliance door, comprising:
    a press having first and second platens selectively movable with respect to each other;
    a male mold member attached to the first platen and shaped to the contour of the appliance door inner liner;
    a female mold member attached to the first platen spaced from the male mold member and shaped to the contour of the appliance door outer panel;
    a movable shuttle box mounted on the second platen;

a first plug assist member within the shuttle box, the shuttle box and first plug assist member being movable on and generally parallel to the second platen into vertical alignment with either the male or female mold member;

a transportation member positioned between the first and second platens and operable for transporting a first plastic sheet into a thermoforming posture with respect to the male mold member and for transporting a second plastic sheet into a thermoforming posture with respect to the female mold member;

a second plug assist member positioned for selective movement into and out of proximity with the female mold member;

the shuttle box and first plug assist member being vertically alignable over the male mold member and cooperable therewith for forming the appliance door inner liner from the first plastic sheet upon movement of the first and second platens toward each other; and the second plug assist member being cooperable with the female mold member when in proximity thereto for forming the appliance door outer panel from the second plastic sheet upon movement of the first platen to bring the female mold member into engagement therewith.

* * * * *